May 6, 1969 F. RÜGER ETAL 3,442,258
INTERNAL COMBUSTION ENGINE IN WHICH COOLING MEDIUM IS SUPPLIED
FROM A PRIMARY COOLING INSTALLATION FOR THE ENGINE COOLING
TO A SECONDARY COOLING INSTALLATION FOR
THE PRECOMPRESSED COMBUSTION AIR
Filed Jan. 24, 1967
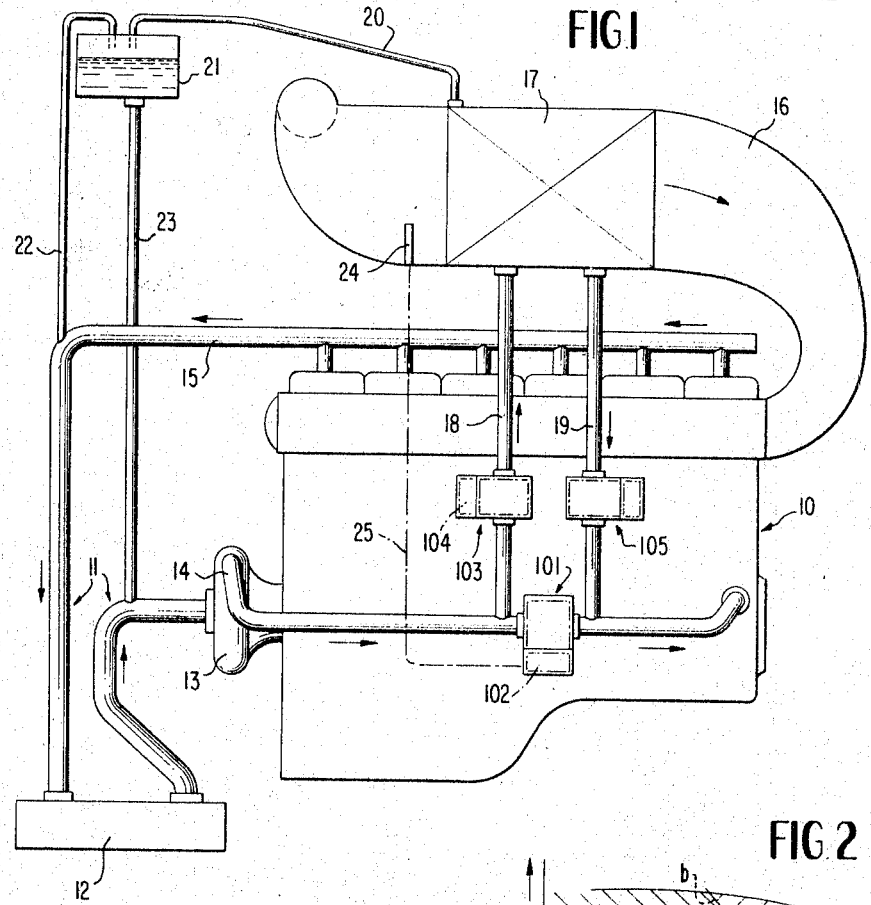
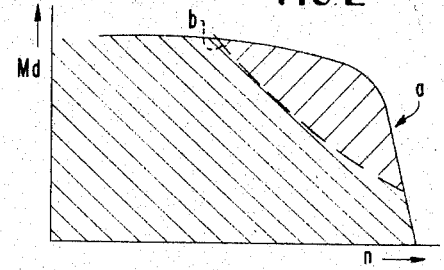
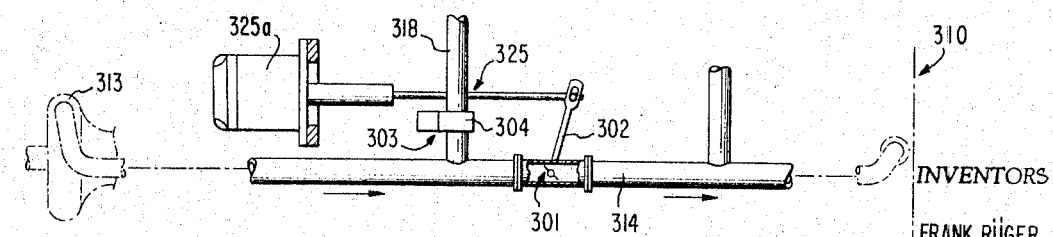
INVENTORS
FRANK RÜGER
HANS-PETER GÜHNE
HERBERT LEBIG
BY
ATTORNEYS

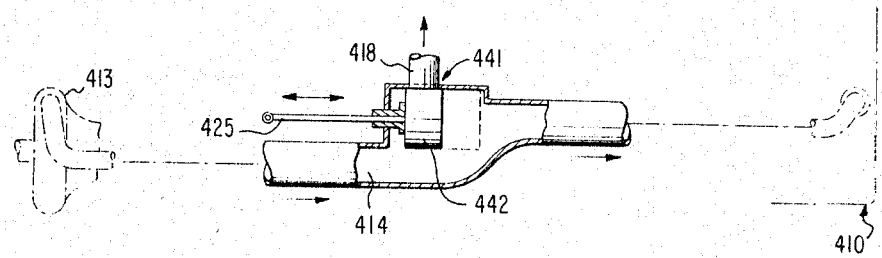
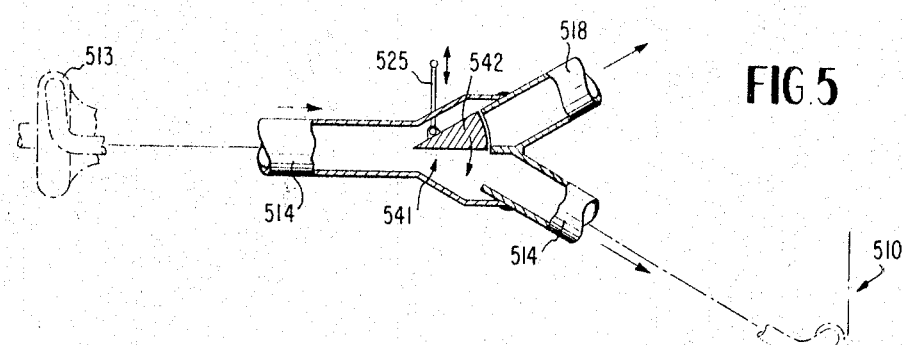
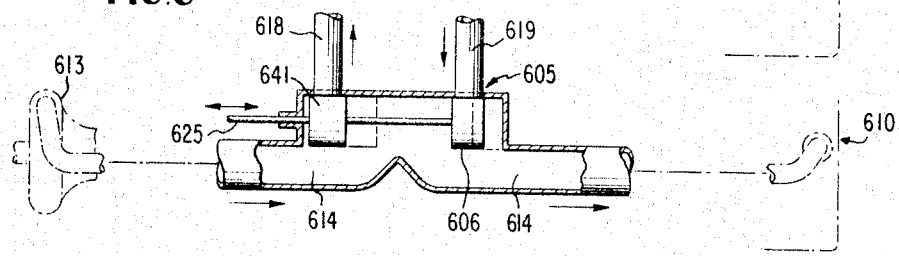
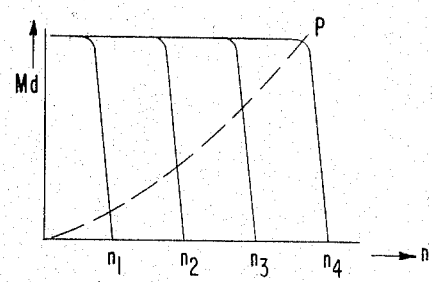

United States Patent Office 3,442,258
Patented May 6, 1969

3,442,258
INTERNAL COMBUSTION ENGINE IN WHICH COOLING MEDIUM IS SUPPLIED FROM A PRIMARY COOLING INSTALLATION FOR THE ENGINE COOLING TO A SECONDARY COOLING INSTALLATION FOR THE PRECOMPRESSED COMBUSTION AIR
Frank Rüger, Waiblingen, Hans-Peter Gühne, Fellbach, Württemberg, and Herbert Lebig, Stuttgart, Germany, assignors to Daimler-Benz Aktiengesellschaft, Stuttgart-Unterturkheim, Germany
Filed Jan. 24, 1967, Ser. No. 611,334
Claims priority, application Germany, Jan. 26, 1966,
D 49,217
Int. Cl. F02b 29/04; F01p 5/10
U.S. Cl. 123—41.31                     22 Claims

ABSTRACT OF THE DISCLOSURE

An internal combustion engine comprising a primary cooling installation supplying liquid from a heat exchanger by way of a supply pump to the cooling spaces of the internal combustion engine and returning the liquid by way of a return line back to the heat exchanger, which is also equipped with a secondary cooling installation for the precompressed combustion air including a heat exchanger arranged in the conduit for the precompressed combustion air leading from the compressor to the engine intake manifold, whereby the heat exchanger of the secondary cooling installation is selectively supplied with cooling liquid by way of a supply line connected with the line section of the primary cooling installation between the supply pump and the cooling spaces and by way of a discharge line connected to the same line section of the primary cooling installation downstream of the place of connection of the supply line for the secondary cooling installation; a control valve is provided for controlling the flow of the cooling medium in the primary cooling installation and possibly also in the supply and discharge branch lines leading to and from the secondary cooling installation in such a manner that the flow of cooling medium to the secondary cooling installation increases as the flow in the line section of the primary cooling installation, bypassing the secondary cooling installation, decreases. The control valve may be actuated in dependence on the temperature of the precompressed combustion air or on a control magnitude reflecting such combustion air temperature.

Background of the invention

The present invention relates to an internal combustion engine in which the cooling medium is supplied from a primary cooling installation for the purpose of engine cooling to a secondary cooling installation for the precompressed combustion air.

With a known internal combustion engine of this type for the drive of aircraft having a compressor driven by an exhaust gas turbine and liquid cooling of the air supplied by the compressor, the air is cooled with that excess of the cooler output which is available starting from a given flight altitude by reason of the decrease of the outside temperature over and above the output necessary for the engine cooling. By this measure, by means of which the cooling of the charging air is matched exclusively to the temperature change of the external air, there is to be prevented an overloading of the engine cooler which is dimensioned and constructed in aircraft for the removal or transfer of a constant, relatively small quantity of heat.

Summary of the invention

The aim underlying the present invention, in contrast to this prior art measure, resides above all in decreasing the thermal loading itself with such an internal combustion engine of the type described above, for which frequent and larger torque changes with constant or nearly constant rotational speed as well as a larger rotational speed range with changing loads are characteristic. With such internal combustion engines which find use, for example, for the drive of vehicles, the engine cooler is dimensioned already for a heat exchanger sufficient to take into consideration the varying loads.

According to the present invention, the outlined problems for an internal combustion engine with a primary and a secondary cooling installation corresponding to the aforementioned type is solved in that the cooling medium of the secondary cooling installation is supplied in dependence on the temperature of the pre-compressed combustion air or in dependence of a control magnitude changing with this temperature.

The "heating up" of the precompressed combustion air by the cooling medium at low loads or low rotational speeds of the combustion engine can be avoided in an advantageous manner by the present invention. The cooling medium is supplied to the secondary cooling installation only above such a temperature which is equal to the temperature of the cooling medium for the engine cooling thermostatically controlled in a conventional manner to an approximately constant value.

With internal combustion engines, it is known to arrange a cooling-medium pump in the cooling-medium line on the inlet side of the engine, which pump supplies the cooling medium from a heat exchanger to the cooling spaces of the internal combustion engine.

In an advantageous construction of the present invention, the supply line of the secondary cooling installation may be connected with such internal combustion engines to the cooling medium line at the inlet side of the engine intermediate the cooling medium pump and the internal combustion engine and a control valve may be arranged in this cooling-medium line which controls the cooling medium flow to the secondary cooling installation.

This control valve may, for example, be operatively connected by way of a mechanical adjusting mechanism or an adjusting drive transmitting an auxiliary force with a sensing device arranged in the line for the precompressed combustion air for sensing a control magnitude reflecting the prevailing condition of the combustion air.

If the internal combustion engine is provided with an exhaust-gas turbine for the drive of the compressor of the combustion air, a mechanism responsive to rotational speed changes of the exhaust gas turbine may be operatively connected with the control valve since the temperature of the precompressed combustion air depends, inter alia, on the rotational speed of the exhaust gas turbine.

With internal combustion engines having fuel injection, it is possible in contrast thereto to influence the control valve in the cooling medium line on the input side of the engine by the control member of the injection pump for the torque since the latter is a measure for the exhaust gas energy and the same determines the rotational speed of the exhaust gas turbine and therewith the temperature of the combustion air.

Internal combustion engines for the propulsion of watercraft are provided for the most part with a regulating device for a constant or approximately constant rotational speed level in which, for example, a so-called "stepping switch" is provided as desired value transmitter for the shifting of the rotational speed level. Each rotational speed level exhibits a characteristic maximum load value inter alia owing to the rotational speed-dependent influence of the torque input of the propulsion propeller. Consequently, it is also possible for the temperature-responsive control of the cooling of the combustion air to permit again movements of the desired value transmitter to influence or act on the control valve provided in the cooling-medium line on the engine inlet side by way of a mechanical adjusting drive or an adjusting drive transmitting an auxiliary force. The valve body is then displaced into a position for larger cooling medium supply to the secondary cooling installation, if the torque input of the propulsion propellers or the loading of the internal combustion engine exceeds a certain value, which is associated with a compression temperature of the combustion air critical in relation to the cooling medium temperature.

In order to avoid endangering the engine cooling owing to lacking supply of cooling medium, there is additionally provided according to the present invention that the effective cross section of the valve body producing the change of the passage or flow cross section in the cooling medium line on the inlet side of the engine is smaller than the line cross section adapted to be influenced by the valve body. It is assured thereby in all positions of the valve body in question that always a free or open flow cross section exists for the cooling medium flowing to the internal combustion engine.

With internal combustion engines having a primary cooling medium circulation for the engine cooling, the cooling medium for the secondary cooling installation may be both removed from the primary cooling medium circulatory system on the inlet side of the engine and also returned thereto on the inlet side of the engine since, on the one hand, cooling medium is necessitated for the combustion air only temporarily and, on the other, the combustion air gives off only little heat by reason of the relative slight temperature difference in relation to the internal combustion engine. Consequently, the temperature increase of the cooling medium heated up in the secondary cooling installation, which is led back into the primary circulatory system, is insignificant for the engine cooling and can be neglected.

According to a further development of the present invention, a control valve for the change of the flow cross section may be arranged in the supply line of the secondary cooling installation. It can be prevented by means of this control valve that larger cooling medium quantities for the secondary cooling installation flow through the venting line of the heat-exchanger for the combustion air which bypasses the internal combustion engine and are lost thereby the engine cooling. The control valve in the secondary supply line may be so coordinated to the control valve in the primary cooling medium circulatory system that the cross section of the secondary supply line necessarily decreases with increasing cross section of the primary cooling medium circulatory system as also forcibly increase with decreasing cross section of the latter. The valve bodies producing the changes in cross section of these two control valves are then operatively connected with each other to provide an interdependent movement.

In order to avoid that the heat exchanger in the secondary cooling installation is at all times under the flow pressure of the primary cooling medium circulatory system in the direction from the internal combustion engine, according to a further feature of the present invention, a control valve may be arranged also in the discharge line of the secondary cooling installation. The body of this valve producing the change in the flow cross section may, in an advantageous construction of the present invention, be adapted to be moved from a first end position throttling the cooling medium supply with a decrease of the line cross section into a second end position blocking the cooling medium supply and vice versa. The rate of flow of the cooling medium of the secondary cooling installation may be matched to the heat transfer characteristic of the associated heat exchanger for the combustion air by the extent of the throttling in the discharge line. Appropriately, the valve bodies producing changes in cross section of secondary supply and discharge line are connected with each other for interdependent movement.

For purposes of simplification of the adjusting drive transmitting the temperature influences, it may be of advantage according to a still further feature of the present invention if a common valve body is provided for purposes of changing the flow cross section both of the primary cooling medium circulatory system as also of the secondary supply line.

Accordingly, it is an object of the present invention to provide an internal combustion engine of the type described above which eliminates by extremely simple means the aforementioned shortcomings and drawbacks encountered in the prior art constructions.

Another object of the present invention resides in an internal combustion engine provided with a primary engine cooling system and a secondary cooling installation for cooling the precompressed combustion air which is so controlled as to avoid unfavorable operating conditions of the engine.

A further object of the present invention resides in a cooling system consisting of primary and secondary cooling installations for the engine and the precompressed combustion air, respectively, of an internal combustion engine, in which sufficient cooling of the engine is assured under all operating conditions without requiring complicated and/or bulky components.

Still another object of the present invention resides in a cooling installation for the internal combustion engine and the precompressed combustion air thereof which is so constructed and arranged as to prevent a heating-up of the precompressed combustion air by the cooling medium during low loads and/or low rotational speeds of the internal combustion engine.

These and further objects, features and advantages of the present invention will become more obvious from the following description when taken in connection with the accompanying drawing which shows, for purposes of illustration only, several embodiments in accordance with the present invention, and wherein:

FIGURE 1 is a schematic view of an internal combustion engine provided with cooling installations according to the present invention;

FIGURE 2 is a diagram for the working area of the internal combustion engine;

FIGURE 3 is a somewhat schematic elevational view of two control valves for the cooling medium according to the present invention;

FIGURE 4 is a somewhat schematic view of a modified embodiment of a valve body for the cooling medium in which are combined the functions of the two control valves according to FIGURE 3;

FIGURE 5 is a schematic view of a structural modification of the control valve according to FIGURE 4;

FIGURE 6 is a schematic view of a still further modified embodiment of two control valves for the cooling medium in accordance with the present invention; and FIGURE 7 is a diagram for the working range of an internal combustion engine which is constructed for the propulsion of watercraft and which is provided with a regulator for an approximately constant rotational speed level.

Referring now to the drawing wherein corresponding reference numerals are used throughout the various views to designate like parts, and more particularly to FIGURE 1 of the drawing, reference numeral 10 generally designates therein a conventional internal combustion engine which is provided with a cooling medium circulatory system 11 for the engine cooling. This cooling medium circulatory system 11 forms part of a primary cooling installation which essentially consists of a heat exchanger 12 for the cooling medium, of a cooling medium pump 13 driven by the internal combustion engine, of the cooling space walls (not shown) of the internal combustion engine 10 for the heat absorption by the cooling medium as well as of a supply line 14 and of a discharge line 15 of the cooling medium between the heat exchanger 12 and the cooling space walls of the internal combustion engine 10.

The combustion air is pre-compressed by a conventional compressor or supercharger (not shown) which is driven by an exhaust gas turbine (not shown). The pre-compressed combustion air is supplied in the line 16 to the combustion spaces of the internal combustion engine 10.

For purposes of cooling the precompressed combustion air, a secondary cooling installation is provided which essentially consists of a heat exchanger 17 for the combustion air located in the line 16 as well as of a supply line 18 and of a discharge line 19 for the cooling medium.

The supply line 18 as also the discharge line 19 of the secondary cooling installation are connected with the cooling medium circulatory system 11 of the primary cooling installation intermediate the cooling medium pump 13 and the internal combustion engine 10, i.e., on the inlet side of the engine.

In order to avoid the formation of air bubbles in the heat exchanger 17, the latter is in connection by way of a venting line 20 with an equalization vessel 21. The discharge line 15 of the primary cooling circulatory system is also provided with a venting line 22 which terminates in the equalization vessel 21. The equalization vessel 21 is connected by way of a line 23 with the primary cooling meduim circulatory system 11 intermediate the heat exchanger 12 and the cooling medium pump 13.

A control valve generally designated by reference numeral 101 (FIG. 1) for the change of the flow cross section is arranged in the primary cooling medium circulatory system 11 between the connections for the secondary supply and discharge lines 18 and 19, respectively. The control part 102 of this control valve 101 is influenced by the temperature of the precompressed combustion air. If the flow cross section in the line 14 is decreased by the control valve 101, then a portion of the cooling medium supplied by the pump 13 flows, by way of the line 18 through the heat exchanger 17 for the combustion air.

It should be mentioned beforehand that for purposes of controlling the cooling medium for the heat exchanger 17 of the secondary cooling installation, a control valve generally designated by reference numeral 103 and a control valve generally designated by reference numeral 105 may be arranged in the supply line 18 and the discharge line 19, respectively, for changing the flow cross section thereof.

In FIGURE 2 of the drawing, there is shown a diagram for the working area of the internal combustion engine 10 according to FIGURE 1 in which the curve $a$ of the maximum torque is indicated as a function of rotational speed $n$.

An exhaust gas energy curve plotted as a function of the rotational speed corresponds to the curve $b$, as is characteristic for a constant temperature of the precompressed combustion air. The air temperature is assumed for the curve $b$ to be equal to the cooling medium temperature thermostatically regulated to a constant value.

There is achieved by the present invention in particular the advantage that the cooling of the combustion air can be realized exclusively in the working area of the internal combustion engine characterized by the surface between the curves $a$ and $b$. For only within this area the occurring temperatures of the precompressed combustion air lie above the cooling medium temperature from the primary cooling installation.

If one supplies cooling medium to the heat exchanger 17 within the working area of the internal combustion engine corresponding to the surface below the curve $b$, then the precompressed combustion air—instead of being cooled off—is heated up so that the thermal loading of the internal combustion engine increases disadvantageously.

As can be further seen from FIGURE 1, a sensing device 24 for the air temperature or for a prevailing control magnitude dependent on this temperature of the combustion air may be arranged in the line 16 for the combustion air on the inlet side of the heat exchanger 17 and may be operatively connected with the control part 102 of the control valve 101. Thus, the sensing member 24, may consist, for example, of an expansion element responding to a temperature difference which acts upon the control part 102 by way of a mechanical linkage 25.

However, it is also within the scope of the present invention that the linkage 25 transmits an auxiliary force to the control part 102 which is controlled by the sensing device 24 in dependence on the temperature of the combustion air.

It is furthermore possible to connect the linkage 25 leading to the control part 102 with another sensing device (not shown) which responds to changes in rotational speed of the exhaust gas turbine since the temperature of the precompressed combustion air is dependent on such rotational speed changes.

If the internal combustion engine 10 is equipped with a fuel injection device, then the linkage in this case may also transmit directly movements of the regulating member of the injection pump for the torque or may transmit an auxiliary force controlled in dependence on these movements. The torque is a measure for the exhaust gas energy from which results a certain rotational speed of the exhaust gas turbine and therewith a certain temperature of the precompressed combustion air.

If the internal combustion engine 10 serves, for example, for propelling a watercraft, then for the control of the propeller drive a so-called "stepping switch" is normally provided as desired value transmitter of a regulating device for a constant or approximately constant traveling velocity. A diagram for the torque input of ships' propellers in dependence on the rotational speed of the internal combustion engine is represented in a simplified manner in FIGURE 7. Depending on the type of regulating device (for example, a proportional-regulator or an isodrom-regulator) a more or less constant curve of the selected rotational speed (for example $n_1$ or $n_2$, etc.), results with varying loads of the internal combustion engine. The curve P of the torque-input of the propeller screws, characteristic for a predetermined type of watercraft, is determinative for the exhaust-gas energy of the internal combustion engine and therewith for the temperature of the precompressed combustion air. Since the magnitude of the torque input P is dependent on the rotational speed level ($n_1$ or $n_2$ . . . $n_4$) preselected by the desired value transmitter, the linkage 25 according to FIGURE 1 may also be constructed for the transmission to the control part 102 of movements of the desired value transmitter or for the transmission of an auxiliary force controlled in dependence of this movement.

It is already indicated in FIGURE 1 that a control valve 103 for changing the flow cross section may be arranged in the supply line 18 of the secondary cooling installation. By this measure is prevented that with an open control valve 101, cooling medium flows off through the venting line 20 of the secondary heat exchanger 17 and is thus lost for the engine cooling. The arrangement of such a control valve in the supply line 18 offers additionally the advantage that the throttling effect of the control member 101 to be considered for the dimensioning of the water pump as loss in cooling medium for the engine cooling is negligible since by closing the line 18, the entire cooling medium supplied by the pump 13 can be forcibly supplied to the internal combustion engine. The control parts 102 and 104 of the control valves 101 and 103 are in operative connection with each other by any known conventional means whereby the arrangement is so made that the cross section of the supply line 18 increases with decreasing cross section of the line 14 and vice versa.

FIGURES 3 to 5 illustrate different embodiments for the control of the cooling medium described hereinabove.

According to FIGURE 3, the control valve arranged in the line 314 of the primary cooling medium circulatory system between water pump 313 and the internal combustion engine 310 consists of a throttle valve 301 which is connected with a lever 302 for rotation in unison therewith. A linkage 325 is pivotally connected to the lever 302, which transmits the stroke movements of an electromagnet 325a.

Current may be supplied to the electromagnet 325a in dependence on the prevailing temperature of the precompressed combustion air. A slide valve 303 is provided in the supply line 318 of the secondary cooling installation whose control slide member 304 is also actuated by the control linkage 325 in any conventional manner.

In FIGURE 4 there is provided a common slide valve 441 both for the supply line 418 of the secondary cooling installation as also for the line 414 of the primary cooling medium circulatory system between the water pump 413 and the internal combustion engine 410. The slide member 442 of the valve 441 is movable between two end positions by means of a linkage 425. In the illustrated end position, the secondary supply line 418 is closed and the line 414 is completely opened. In the end position indicated in dash line of the control slide member 442, the secondary supply line 418 is completely opened and the primary line 414 is only partly opened.

According to FIGURE 5, a slide valve 541 may be arranged in the line 514 of the primary cooling medium circulatory system between the water pump 513 and the internal combustion engine 510 whose pivotal control slide 542 is adapted to be moved by means of linkage 525 into two end positions. In the illustrated end position, the supply line 518 of the secondary cooling installation is closed, and the primary line 514 is completely opened. The free flow cross section of the two lines 514 and 518 are different from one another. The cross section of the line 518 is smaller and the cross section of line 514 is greater than the effective cross section of the slide member 542. It is achieved thereby that also in the other, not illustrated, end position of the slide member 542 in which cross section of the line 518 is completely opened up, the line 514 is throttled but not completely colsed off.

It is already indicated in FIGURE 1 that a further control valve 105 for changing the flow cross section may be arranged in the discharge line 19 of the secondary cooling installation. One prevents by means of this valve 105 that with closed supply line 18, cooling medium flows through the discharge line 19 by way of the heat exchanger 17 into the venting line 20 and is thus lost for the engine cooling. A further advantage by the arrangement of a valve in the discharge line 19 essentially consists in that by throttling the same, the flow quantity in the heat exchanger 17 can be adapted to be a heat-transfer characteristic thereof.

A control valve 605 for the discharge line 619 of the secondary cooling installation is shown in FIGURE 6. The control slide member 606 of this valve 605 is adapted to be moved between two end positions. In the illustrated end position, the discharge line 619 is closed off whereas in the end position indicated in dash line the discharge line 619 is still throttled, i.e., is therefore never completely opened. The control slide member 606 is actuated from a linkage 625 with which is also connected the common control slide member 641 both for the line 614 in the primary cooling circulatory system between the water pump 613 and the internal combustion engine 610 as also for the secondary supply line 618.

We claim:

1. An internal combustion engine comprising a primary cooling installation for engine cooling, a secondary cooling installation for cooling the precompressed combustion air, means for selectively supplying cooling medium from said primary cooling installation to said secondary cooling installation in dependence on a control magnitude reflecting changes in the temperature of the combustion air, said primary cooling installation including cooling medium line means and cooling medium pump means in the cooling medium line section on the inlet side of the engine, and wherein the secondary cooling installation includes supply line means connected with said cooling medium line section between said cooling medium pump means and the internal combustion engine, said means for selectively supplying the cooling medium to the secondary cooling installation including control valve means in said cooling medium line section which influences the cooling medium supply to the secondary cooling installation.

2. An internal combustion engine according to claim 1, wherein the cooling medium is supplied to the secondary cooling installation in dependence on the temperature of the precompressed combustion air.

3. An internal combustion engine according to claim 1, wherein said valve means has a relatively movable valve body with an effective cross section smaller than the flow cross section in the cooling medium line section on the engine input side and means for moving said valve body into said line means flow cross section to at most only partially block said line section.

4. An internal combustion engine according to claim 3, wherein said primary cooling installation includes primary cooling medium circulatory means for the engine cooling, said means for supplying cooling medium to said secondary cooling installation both removing as well as returning the cooling medium to the primary cooling medium circulatory means at the engine inlet side of the primary circulatory means.

5. An internal combustion engine according to claim 4, further comprising control valve means arranged in the supply line means of the secondary cooling installation for changing the flow cross section thereof.

6. An internal combustion engine according to claim 5. wherein the valve bodies of the control valve means changing the cross sections of the primary cooling medium circulatory means and the secondary supply line means are operatively connected with each other.

7. An internal combustion engine according to claim 6, further comprising discharge line means in the secondary cooling installation, and control valve means in said discharge line means for changing the flow cross section thereof.

8. An internal combustion engine according to claim 7, wherein the valve body of the control valve means in the secondary discharge line means changing the flow cross section thereof is adapted to be moved from a first end position throttling the cooling medium supply while decreasing the discharge line cross section into a second end position blocking the cooling medium supply and vice versa.

9. An internal combustion engine according to claim 8, wherein the valve bodies of the control valve means producing the change in cross section of the secondary supply and discharge line means are operatively connected with each other.

10. An internal combustion engine according to claim 9, further comprising common valve means for changing the flow cross section of the primary cooling medium circulatory means as well as the secondary supply line means.

11. An internal combustion engine according to claim 1, further comprising control valve means arranged in the supply line means of the secondary cooling installation for changing the flow cross section thereof.

12. An internal combustion engine according to claim 11, further comprising discharge line means in the secondary cooling installation, and control valve means in said discharge line means for changing the flow cross section thereof.

13. An internal combustion engine according to claim 12, wherein the valve body of the control valve means in the secondary discharge line means changing the flow cross section thereof is adapted to be moved from a first end position throttling the cooling medium supply while decreasing the discharge line cross section into a second end position blocking the cooling medium supply and vice versa.

14. An internal combustion engine according to claim 13, wherein the valve bodies of the control valve means producing the change in cross section of the secondary supply and discharge line means are operatively connected with each other.

15. An internal combustion engine according to claim 14, further comprising common valve means for changing the flow cross section of the primary cooling medium circulatory means as well as the secondary supply line means.

16. An internal combustion engine according to claim 12, wherein the valve bodies of the control valve means producing the change in cross section of the secondary supply and discharge line means are operatively connected with each other.

17. An internal combustion engine according to claim 1, wherein said primary cooling installation includes primary cooling medium circulatory means for the engine cooling, said means for supplying cooling medium to said secondary cooling installation both removing as well as returning the cooling medium to the primary cooling medium circulatory means at the engine inlet side of the primary circulatory means.

18. An internal combustion engine according to claim 1, further comprising discharge line means in the secondary cooling installation, and control valve means in said discharge line means for changing the flow cross section thereof.

19. An internal combustion engine comprising a primary cooling installation for engine cooling, a secondary cooling installation for cooling the precompressed combustion air, means for selectively supplying cooling medium from said primary cooling installation to said secondary cooling installation in dependence on a control magnitude reflecting changes in the temperature of the combustion air, said means for selectively supplying cooling medium to said secondary cooling installation includes valve means having a relatively movable valve body with an effective cross section smaller than the flow cross section in the cooling medium line section on the engine input side and means for moving said valve body into said line section flow cross section to at most only partially block said line section.

20. An internal combustion engine according to claim 19, wherein said primary cooling installation includes primary cooling medium circulatory means for the engine cooling, said means for supplying cooling medium to said secondary cooling installation both removing as well as returning the cooling medium to the primary cooling medium circulatory means at the engine inlet side of the primary circulatory means.

21. An internal combustion engine according to claim 20, wherein the valve bodies of the control valve means changing the cross sections of the primary cooling medium circulatory means and the secondary supply line means are operatively connected with each other.

22. An internal combustion engine according to claim 20, further comprising common valve means for changing the flow cross section of the primary cooling medium circulatory means as well as the secondary supply line means.

References Cited
UNITED STATES PATENTS

| | | | |
|---|---|---|---|
| 2,372,272 | 3/1945 | Helmore. | |
| 2,362,015 | 11/1944 | Lundquist | 123—41.31 XR |
| 3,134,371 | 5/1964 | Crooks | 123—41.31 |
| 3,144,749 | 8/1964 | Miller | 60—13 |
| 3,162,998 | 12/1964 | Williams. | |

WENDELL E. BURNS, *Primary Examiner.*

U.S. Cl. X.R.
60—13; 123—119